A. Ball.
Magazine Fire-arm.
No. 1635. Reissued Mar. 15. 1864.
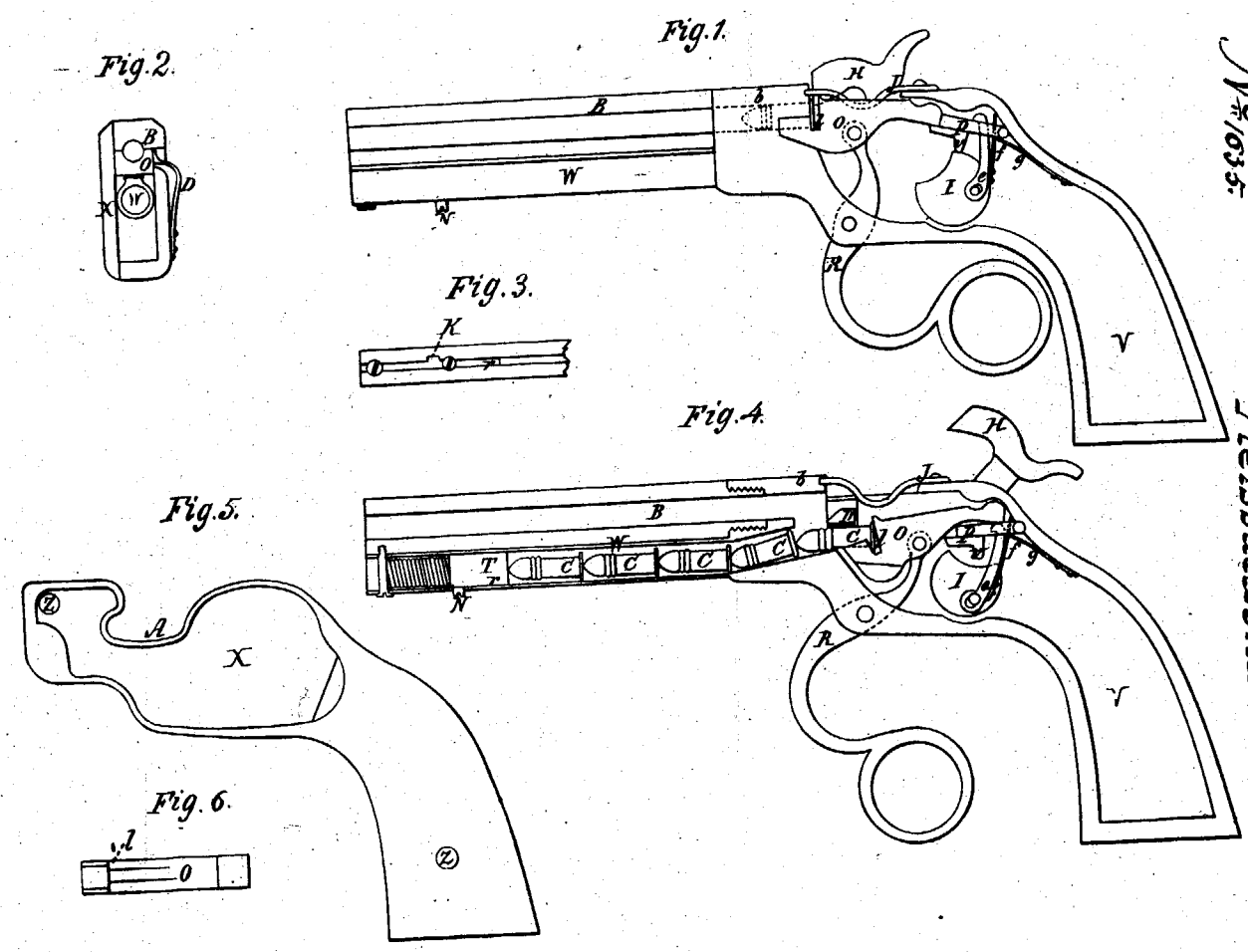
Witness
A. D. Hale Jr
E. H. Dean.
Inventor:
Albert Ball
by his attorney
R. Mobley

UNITED STATES PATENT OFFICE.

ALBERT BALL, OF WORCESTER, MASSACHUSETTS.

IMPROVEMENT IN SELF-LOADING FIRE-ARMS.

Specification forming part of Letters Patent No. 38,935, dated June 23, 1863; Reissue No. 1,635, dated March 15, 1864.

*To all whom it may concern:*

Be it known that I, ALBERT BALL, a resident of the city and county of Worcester, and State of Massachusetts, have invented a new and useful or Improved Breech-Loading Fire-Arm; and I do hereby declare the same to be fully described in the following specification, and represented in the accompanying drawings, of which—

Figure 1 denotes a side view of it with its operative parts in their proper positions at the instant of discharge of a cartridge. Fig. 2 is a transverse section taken through the charge-chamber. Fig. 3 is a view of the under side of the upper portion of the magazine. Fig. 4 is a longitudinal section of the arm, the operative parts being therein exhibited as in the positions in which they are at the discharge of a cartridge from the magazine, and preparatory to the raising of such cartridge up to, and its deposit within, the charge-chamber of the barrel. Fig. 5 is a side view of the movable side plate or cover of the lock-case. Fig. 6 is a top view of the charge-carriage.

The fire-arm represented in the drawings is a repeating-pistol; but my invention is equally applicable to a rifle, a musket, or a carbine.

The several charges (which are what is termed "fixed ammunition") are contained within a tube or magazine, which is situated underneath and alongside of the barrel, in manner as represented in the drawings, in which B denotes the barrel, and W the magazine. The barrel is screwed into the part *b* of the stock, in which the charge-chamber is partially constructed, the remainder of the charge-chamber being formed in a charging-carriage. (Represented at O in Figs. 1 and 4.)

In my invention the charging-carriage is employed not only for receiving a cartridge from the magazine and transporting it to and inserting it within the charge-chamber, and so to be ready for being exploded, but is also subsequently employed, or after discharge of the cartridge, for extracting from the charge-chamber, or that part of it directly connected with and stationary with the barrel, the shell of such cartridge. Furthermore, the charging-carriage is so made as to enable the shell, after having been so withdrawn, to be ejected laterally from the carriage by the action of a spring or other device.

The several cartridges as arranged within the magazine are exhibited at C C C, the rear-most one being placed within the charging-carriage O. This carriage, formed as shown in Figs. 1, 2, and 4, is joined to a trigger-guard lever, R, by means of which the elevation and depression of the charging-carriage may be effected.

P is a locking-piece or device for preventing the carriage O from being driven backward durning discharge of a cartridge. This locking-piece has a flange or projection, *v*, which rests on a tumbler, I, and is provided with a spring, *g*, whose object is to effect the elevation of the locking-piece.

H is the hammer or cock, on whose center-pin or axle the tumbler I is fixed. This tumbler carries a lever catch, *e*, by which the locking-piece P is drawn downward and away from the carriage O at the proper period preparatory to being moved backward and downward with respect to the barrel or its portion of the charge-chamber. A small spring, *f*, applied to the catch *e*, operates to keep the catch in proper connection with the locking-piece P.

The movable side piece, X, (shown in Fig. 5,) is to be fastened to the stock V by means of screws, the heads of which are represented at Z Z in such figure. This side plate is recessed or notched at A for a twofold purpose—that is to say, not only in order that the cartridges may be introduced through the notch A into the magazine, but that their shells, after explosion of their charges, may be successively ejected from the cartridge-carriage.

Each of the cartridges used in my said fire-arm has a copper or metallic shell or powder-cup, which not only contains the powder and ball, but has a flange at its rear end for holding the percussion-powder, the form of the cartridge being as shown in Fig. 4. The flange, when the cartridge is within its socket of the carriage O rests within a corresponding recess or groove, *l*, formed at the rear of the socket, and against the breech or back thereof. The breech of the cartridge rests against the said breech or back of the socket, which, when the cartridge is within the load-chamber of the barrel, constitutes a breech for the barrel.

The load-chamber is partly formed in the stock and partly in the carriage O. As the shell of the cartridge when in the charge-chamber overlaps the joint between the front end of the carriage O and its next adjacent part of the stock, such joint will be protected by such shell from the action of the gases resulting from the explosion of the powder. The flange of the cartridge also serves to make a close joint at the breech or rear end of the charge-chamber.

A helical spring, S, placed within the magazine and in advance of the cartridges, serves, by means of a plunger, T, to press them backward toward the cartridge-carriage O, as occasion may require. This plunger has a small projection or knob, N, extending from it and through a groove, *r*, made longitudinally in the magazine, the knob N serving to enable the spring S to be contracted or the plunger to be moved forward preparatory to the charging of the magazine with cartridges.

A notch, K, (see Fig. 3,) serves to receive the knob, and to hold the plunger stationary during the introduction of the cartridges into the magazine.

With the carriage O there is employed a cartridge-shell discharger or spring, D. (See Figs. 2 and 4.) During the forward movement of the carriage O such carriage will press back the spring, which, as soon as the carriage may have been retracted, will be free to act against the cartridge-shell and eject it laterally from the carriage.

J is a spring or guard, by which the cartridge, while being raised up by the carriage O, is maintained in place thereon.

The operation of the fire-arm may be thus described: Preparatory to charging the magazine with cartridges the spring S should be contracted, and afterward should be held so by turning the knob N laterally into the notch K. The charging-carriage having been depressed to its lowest position, the cartridges should be successively inserted through the depression A and into the magazine, after which the knob N should be turned out of the notch K, in order that the plunger, by means of the spring, may be so borne against the row of cartridges as to press them toward the charging-carriage O. Next, by pulling the lever R upward toward the stock the charging-carriage, with a cartridge, will be elevated, and during its rise will be moved forward until it may have reached its position, as shown in Fig. 1. The shell of the cartridge while in the charge-chamber will close the joints thereof in manner as hereinbefore mentioned.

During the passage of the charging-carriage O from its position, as shown in Fig. 4, into that as represented in Fig. 1, the rear end of the said carriage will slide forward on the upper surface of the locking-piece P and off the key or catch *e*, and as soon as the carriage may have introduced the cartridge into the barrel or charge-chamber thereof the piece P will be thrown up by the action of the spring *g*, and will lock the said carriage in position.

During the transition of the charging-carriage O from its position, as shown in Fig. 4, to that exhibited in Fig. 1, the hammer H will remain stationary and elevated, as shown in Fig. 4, ready to be thrown down for discharging the cartridge, the depression of the hammer being effected by a mainspring, which, with the trigger to be applied to the tumbler, is not represented in the drawings.

It will be impossible to discharge the cartridge until the locking-piece may have been elevated into its highest position.

During the upward movement of the carriage O the flange of the cartridge within it will be moved in contact with the spring J, which, on entering a notch in the top of the carriage and bearing on the flange, will serve to keep the cartridge in its proper position until it may enter or have passed into the charge-chamber or bore of the arm. The hammer, by striking against the flange of the cartridge, explodes the priming thereof. At the moment the hammer is thrown against the cartridge the tumbler will have been turned around with respect to the projection *v* of the locking-piece P in manner as shown in Fig. 1, and so as to prevent any downward movement of the piece P during expulsion of the cartridge.

After having discharged the fire-arm the hammer should be raised. During the descent of the hammer to explode the cartridge the key or catch *e* will be elevated and locked in the upper side of the piece P, and will pull downward the said piece P during the elevation of the hammer. By depressing the lever R the carriage O will be moved backward on the piece P, and will be depressed at its front end. The shell of the cartridge in the meanwhile will be drawn out of the cartridge-chamber, and be thrown off or rejected from the carriage by the reaction of the spring D, after which another cartridge will be forced into place on the carriage ready for being raised up to the charge-chamber. During the rearward movement of the carriage O it will press the catch *f* out of action on the locking-piece P.

What I claim as my invention in the above-described fire-arm is as follows, viz:

1. I claim the mode, substantially as described, of making the rear part of the barrel or cartridge-chamber and the front part of the charging-carriage—that is to say, making the charging-carriage with a recess or trough for receiving a cartridge and allowing of the ejectment of its shell, in manner as explained, and so constructing the breech end of the barrel or the cartridge-chamber thereof that such recess or trough of such charging-carriage may, when the cartridge is in place in the bore or cartridge-chamber, form part of and complete such cartridge-chamber, in manner substantially as described.

2. I also claim the combination of the ejecting-spring D with the charging-carriage, when constructed and combined with a magazine and barrel substantially in manner, and so as to operate therewith, as hereinbefore explained.

3. I also claim the combination of the locking-piece P, with its actuating mechanism—viz., the spring *g* and catch *f*—with the tumbler I and the charging-carriage O, the whole being constructed and arranged in manner, and so as to operate together, substantially as explained.

4. I also claim the charging-carriage, as made in manner and so as to operate with the magazine and the barrel, as described—viz., to receive within it a cartridge from the magazine to raise it up to the barrel or charge-chamber thereof, to form part of and serve as a breech to such chamber, and finally to withdraw the shell of the cartridge therefrom, all as explained.

ALBERT BALL.

Witnesses:
E. Y. LAMSON,
CARLOS COOLIDGE.